(12) United States Patent
Nitta et al.

(10) Patent No.: US 10,434,404 B2
(45) Date of Patent: Oct. 8, 2019

(54) COMPUTER-READABLE NON-TRANSITORY STORAGE MEDIUM HAVING STORED THEREIN GAME PROGRAM, GAME PROCESSING METHOD, GAME SYSTEM, AND INFORMATION PROCESSING APPARATUS

(71) Applicant: NINTENDO CO., LTD., Kyoto (JP)

(72) Inventors: Masahiro Nitta, Kyoto (JP); Kazuyoshi Sensui, Kyoto (JP); Mai Yamamoto, Kyoto (JP); Masashi Oishi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 83 days.

(21) Appl. No.: 15/614,649

(22) Filed: Jun. 6, 2017

(65) Prior Publication Data

US 2018/0008887 A1 Jan. 11, 2018

(30) Foreign Application Priority Data

Jul. 6, 2016 (JP) .................... 2016-134361

(51) Int. Cl.

| A63F 9/24 | (2006.01) |
|---|---|
| A63F 13/00 | (2014.01) |
| G06F 17/00 | (2019.01) |
| G06F 19/00 | (2018.01) |
| A63F 13/216 | (2014.01) |
| A63F 13/35 | (2014.01) |
| A63F 13/825 | (2014.01) |
| A63F 13/428 | (2014.01) |
| A63F 13/822 | (2014.01) |

(52) U.S. Cl.
CPC ............ *A63F 13/216* (2014.09); *A63F 13/35* (2014.09); *A63F 13/428* (2014.09); *A63F 13/822* (2014.09); *A63F 13/825* (2014.09)

(58) Field of Classification Search
CPC . G07F 17/3237; G07F 17/3239; A63F 13/216
See application file for complete search history.

(56) References Cited

U.S. PATENT DOCUMENTS

2017/0061736 A1\* 3/2017 Lutnick .................. G07F 17/32

FOREIGN PATENT DOCUMENTS

JP 2002-273034 9/2002

\* cited by examiner

*Primary Examiner* — Milap Shah
*Assistant Examiner* — Jason Pinheiro
(74) *Attorney, Agent, or Firm* — Nixon & Vanderhye P.C.

(57) ABSTRACT

Current position information of an information processing apparatus is acquired by using a positional information acquiring section, and a distance, in a real space, between a current position and a target position that is a position corresponding to a predetermined position in the real space is calculated. Then, a predetermined process based on the calculated distance is executed when a parameter value indicating a virtual movement range of a player satisfies a first condition according to the calculated distance.

20 Claims, 17 Drawing Sheets

FIG. 7

```
                                    123
    301
         SERVER-SIDE GAME PROGRAM
    302
         PLAYER DATA BASE
    304
         ANIMAL OBJECT DATA
         ⋮
```

| PLAYER ID (311) | FUEL VALUE DATA (312) | BELONGING DATA (313) | ... |
|---|---|---|---|
| 000001 | 100/100 | ... | ... |
| 000002 | 110/120 | ... | ... |
| 000003 | 150/150 | ... | ... |
| ⋮ | ⋮ | ⋮ | |

| OBJECT ID (321) | EXISTENCE POSITION (322) | POSSESSION ITEM (323) | ... |
|---|---|---|---|
| 0001 | 34° 58'11.7"N 135° 45'22.6"E | ○○○ | ... |
| 0002 | 35° 48'01.2"N 137° 04'42.3"E | △△△ | ... |
| 0003 | 34° 58'19.3"N 135° 45'16.5"E | □□□ | ... |
| ⋮ | ⋮ | ⋮ | |

| OBJECT ID | EXISTENCE POSITION | CAPABILITY-TO-VISIT FLAG |
|---|---|---|
| 0001 | 34° 58'11.7"N 135° 45'22.6"E | ON |
| 0002 | 35° 48'01.2"N 137° 04'42.3"E | ON |
| 0003 | 34° 58'19.3"N 135° 45'16.5"E | ON |
| ⋮ | ⋮ | ⋮ |

COMPUTER-READABLE NON-TRANSITORY STORAGE MEDIUM HAVING STORED THEREIN GAME PROGRAM, GAME PROCESSING METHOD, GAME SYSTEM, AND INFORMATION PROCESSING APPARATUS

CROSS REFERENCE TO RELATED APPLICATION

The disclosure of Japanese Patent Application No. 2016-134361, filed on Jul. 6, 2016, is incorporated herein by reference.

FIELD

The exemplary embodiment relates to game processing executed by smart devices each including a positional information acquiring section, and more particularly to game processing utilizing positional information.

BACKGROUND AND SUMMARY

Conventionally, game apparatuses using positional information have been known. For example, there has been known a game in which, for example, a player moves in the real world, and when the route of the movement satisfies a predetermined condition or when the player approaches a specific position (destination), a privilege is given to the player.

In the game using the positional information as described above, the player himself/herself needs to satisfy the predetermined condition by moving in the real world. That is, the game is premised on that the player himself/herself moves in the real world.

Therefore, it is a feature of the exemplary embodiment to provide a new game program etc. using positional information in the real world, which enables a player to enjoy the game even if the player himself/herself does not move in the real world.

In order to attain the feature described above, the following configuration examples are exemplified.

A configuration example is directed to a computer-readable non-transitory storage medium having stored therein a game program executed by a computer of an information processing apparatus including a positional information acquiring section, and the game program causes the computer to operate as a current position acquiring section, a distance calculating section, and a process executing section. The current position acquiring section is configured to acquire, by using the positional information acquiring section, current position information indicating a current position of the information processing apparatus. The distance calculating section is configured to calculate a distance, in a real space, between a target position that is a position corresponding to a predetermined position in the real space, and a current position indicated by the current position information acquired by the current position acquiring section. The process executing section is configured to execute a predetermined process based on the calculated distance. When a parameter value indicating a virtual movement range of a player satisfies a first condition according to the calculated distance, the process executing section executes a predetermined process based on the calculated distance. The computer-readable storage medium as used herein includes a magnetic medium such as a flash memory, a ROM, or a RAM, or an optical medium such as a CD-ROM, a DVD-ROM, or a DVD-RAM.

According to the above configuration example, it is possible to provide a new game using positional information in the real world, in particular, the distance between the two points.

In another configuration example, the process executing section may include a parameter-adaptive distance calculating section configured to calculate a distance according to the parameter value indicating the virtual movement range of the player. The process executing section may determine that the first condition is satisfied, when the distance calculated by the distance calculating section is equal to or less than the distance according to the parameter value. Alternatively, the process executing section may determine whether or not the parameter value is larger than a value according to the calculated distance, and determine that the first condition is satisfied, when the parameter value is larger than the value according to the calculated distance.

According to the above configuration example, it is possible to execute game processing in which a parameter indicating the action of the player, such as a stamina value of the player, a fuel value, or the like is associated with the distance from the current position to the target position, whereby amusement of the game can be enhanced.

In another configuration example, when the process executing section has executed the predetermined process based on the calculated distance, the process executing section may subtract a value according to the distance from the parameter value indicating the virtual movement range of the player.

According to the above configuration example, amusement of the game can be enhanced.

In another configuration example, the game program may cause the computer to further operate as a parameter value increasing section configured to increase the parameter value indicating the virtual movement range of the player by satisfying a second condition. In addition, an upper-limit value may be set for the parameter value indicating the virtual movement range of the player.

According to the above configuration example, amusement of the game can be enhanced by, for example, increasing the parameter value by utilizing a charging item, or increasing the parameter value by taking a level-up element of the player into the game and raising the level thereof. Alternatively, amusement of the game can also be enhanced by setting an upper-limit value for the parameter value.

In another configuration example, the game program may cause the computer to further operate as a positional relationship presenting screen display section configured to display a positional relationship between the current position and the target position on a screen of the information processing apparatus so that the player can visually recognize the positional relationship. Further, the positional relationship presenting screen display section may display a virtual map, and may display a screen in which a first object is displayed at a position, on the virtual map, corresponding to the current position, and a second object is displayed at a position, on the virtual map, corresponding to the target position. Moreover, there may be a plurality of the target positions, and the game program may further cause the computer to operate as a specification input receiving section configured to receive an input that specifies any of the second objects corresponding to the plurality of target positions.

According to the above configuration example, it is possible to present the positional relationship between the current position and the target position to the player in an easily understandable manner. Further, when there are a plurality of the target positions, it is possible to cause the player to specify any of the target positions, whereby convenience of the player and amusement of the game can be enhanced.

In another configuration example, the positional relationship presenting screen display section may display, among the second objects, a second object that satisfies a predetermined condition and a second object that does not satisfy the predetermined condition in different display modes.

According to the above configuration example, convenience of the player can be further enhanced, and amusement of the game can be further enhanced.

In another configuration example, the target position may be changed according to a predetermined condition. For example, the target position may be changed according to the lapse of time, or the target position may be moved according to the lapse of time so that the second object moves on the virtual map according to the lapse of time.

According to the above configuration example, even when the player himself/herself scarcely moves, opportunities of execution of the predetermined process based on the calculated distance can be increased, whereby amusement of the game can be further enhanced.

In another configuration example, the information processing apparatus may be a smart device.

According to the above configuration example, it is possible to provide, to the player, a new way to enjoy the game, that is, actually moving on foot in the real world, whereby amusement of the game can be further enhanced.

According to the present embodiment, it is possible to provide a new game using positional information in the real world.

BRIEF DESCRIPTION OF THE DRAWINGS

FIG. 7 shows a non-limiting example of a program and information stored in a main memory 123 of the server 101;

FIG. 8 shows a non-limiting example of the structure of a player data base 302;

FIG. 9 shows a non-limiting example of the structure of animal object data 304;

DETAILED DESCRIPTION OF NON-LIMITING EXAMPLE EMBODIMENTS

Hereinafter, an exemplary embodiment will be described.

Figure 1:
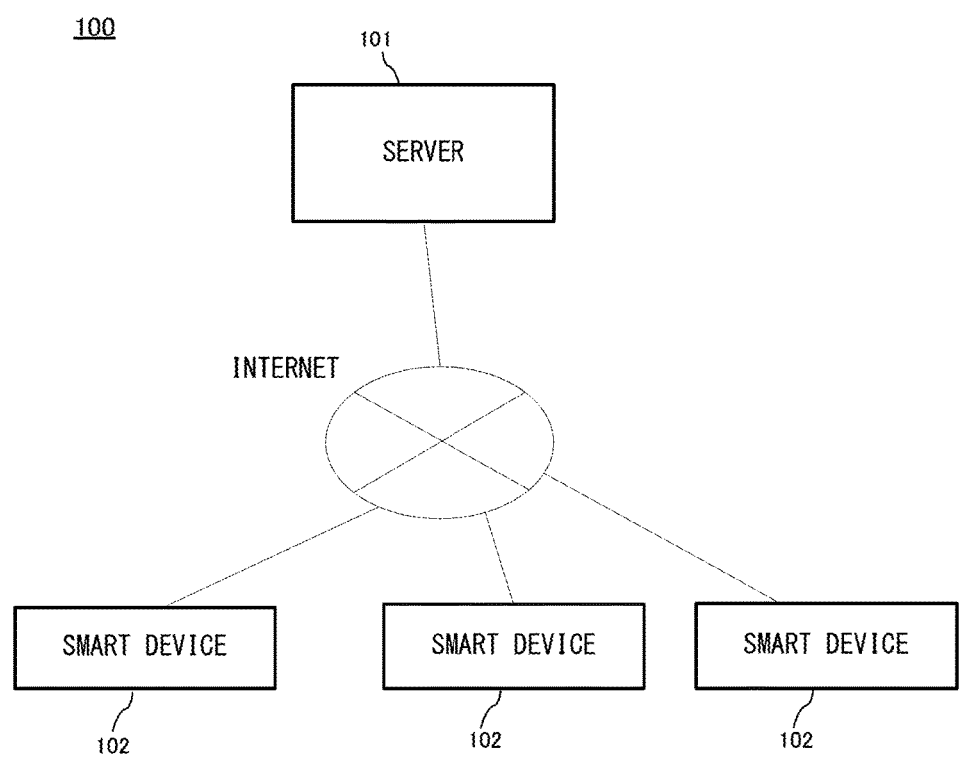
FIG. 1 is a schematic diagram showing the whole image of a game system that is a non-limiting example of an embodiment.

FIG. 1 is a schematic diagram showing the whole image of a game system according to an embodiment. The game system 100 according to the embodiment includes a server 101, and a plurality of hand-held smart devices 102 (hereinafter simply referred to as "smart devices") which are a non-limiting example of information processing apparatus. Each smart device 102 is, for example, a smartphone, a tablet, or the like. The server 101 and the smart devices 102 are configured to be communicable with each other via the Internet. In this embodiment, it is assumed that a communication service among the smart devices is provided in the above configuration. An application for implementing the communication service is installed in each smart device 102. Each smart device 102 transmits/receives predetermined data to/from another smart device via the server 101, thereby providing the communication service to the user of the smart device 102.

Figure 2:
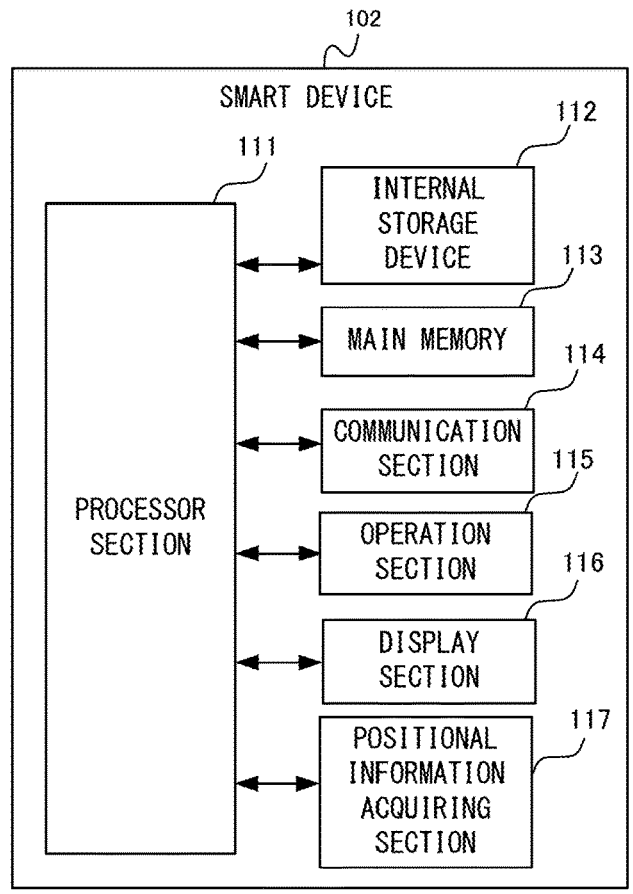
FIG. 2 is a block diagram showing a non-limiting example of the structure of a smart device 102.

Next, the hardware configuration in the above-described system will be described. FIG. 2 is a functional block diagram of the smart device 102. In FIG. 2, the smart device 102 includes a processor section 111, an internal storage device 112, a main memory 113, a communication section 114, an operation section 115, a display section 116, and a positional information acquiring section 117. The processor section 111 executes later-described information processing, and executes a system program (not shown) for controlling the overall operation of the smart device 102, thereby controlling the operation of the smart device 102. The processor section 111 may be equipped with a single processor or a plurality of processors. The internal storage device 112 stores therein various programs to be executed by the processor section 111, and various kinds of data to be used in the programs. The internal storage device 112 is, for example, a flash EEPROM or a hard disk device. The main memory 113 temporarily stores therein computer programs and information. The communication section 114 is connected to an network by wired or wireless communication, and transmits/receives predetermined data to/from the server 101. The operation section 115 is, for example, an input device for receiving an operation performed by a user. The display section 116 is typically a liquid crystal display unit. In processing according to the present embodiment, a touch panel integrated with a liquid crystal screen is assumed as the operation section 115 and the display section 116. In another embodiment, a predetermined pointing device other than a touch panel may be used as the operation section 115. The positional information acquiring section 117 is, for example, a GPS receiver, and is able to acquire information (e.g., latitude and longitude) indicating the current position thereof.

Figure 3:
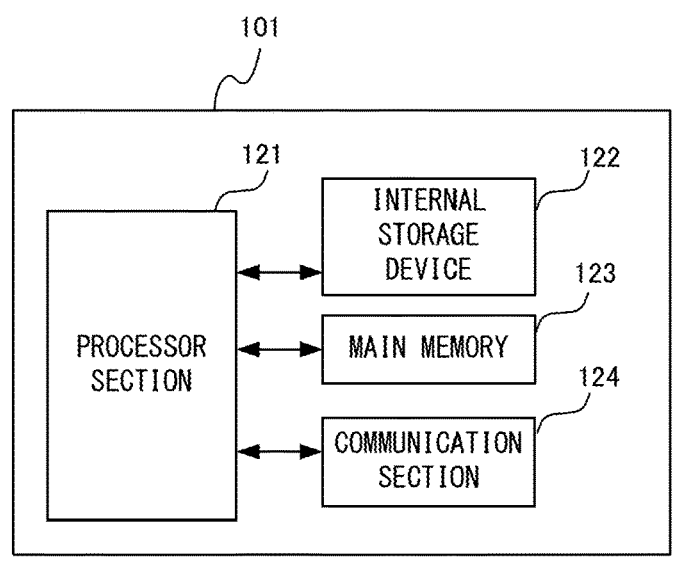
FIG. 3 is a block diagram showing a non-limiting example of the structure of a server 101.

Next, the structure of the server 101 will be described. FIG. 3 is a functional block diagram of the server 101. The server 101 includes at least a processor section 121, an internal storage device 122, a main memory 123, and a communication section 124. The processor section 121 executes various programs for controlling the server 101. The internal storage device 122 stores therein various programs to be executed by the processor section 121, and various kinds of data to be used in the programs. The main memory 123 temporarily stores therein computer programs and information. The communication section 124 is connected to the network by wired or wireless communication, and transmits/receives predetermined data to/from the smart devices 102 and other servers (not shown).

Next, the outline of operation of information processing according to the present embodiment will be described. First, the outline of operation of a game assumed in the present embodiment will be described. In the present embodiment, a game utilizing positional information is assumed. The current position of a smart device is reflected in the position of a player object in a virtual game world. A predetermined position in the real world is set as a "target position", and the target position is reflected in the virtual game world (this target position is managed by the server 101, and is appropriately set by the server 101). When the player moves the player object to the target position in the virtual game world, the player can get a predetermined item, for example. Thus, the game assumed in the present embodiment is a game in which the player moves the player object to various target positions to collect items.

The outline of the game assumed in the present embodiment will be described more specifically by using examples of screens. In this game, animal objects exist in addition to the player object, and the position of each animal object corresponds to the target position. The player makes the player object go to see these animal objects and get items from the animal objects. The distance between the current position of the smart device in the real world and the position, in the real world, corresponding to the target position is reflected in the distance between the player object and the animal object in the virtual game world. Therefore, for example, when the player who carries the smart device approaches the target position in the real world, the distance between the player object and the animal object can be shortened in the virtual game world. In the following description, a "current position" and a "target position" each mean a position in the real world, and a "position of an animal object" means a position in the virtual game world (position corresponding to a target position).

Figure 4:
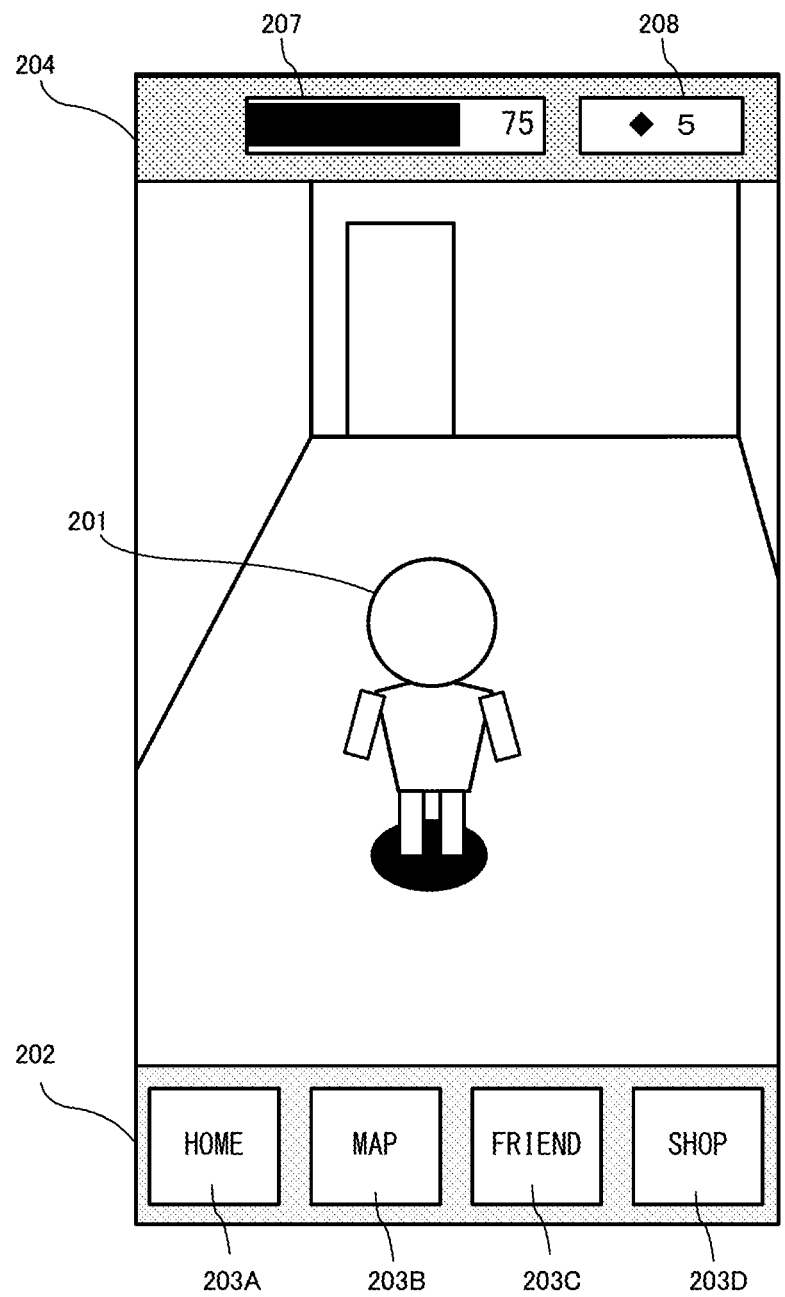
FIG. 4 shows a non-limiting example of a game screen according to the embodiment.

FIG. 4 shows an example of a screen of this game, which is so-called "home screen". Basically, after the game is started up, such a home screen is displayed first. FIG. 4 shows a scene in which a player object 201 is present in his/her room. In this game, the player makes the player object 201 "go out" of his/her room to see the animal objects described above. In a lower portion of the screen, a footer region 202 including a plurality of button images 203A to 203D is displayed. In an upper portion of the screen, a header region 204 is displayed. The header region 204 will be described later.

Figure 5:
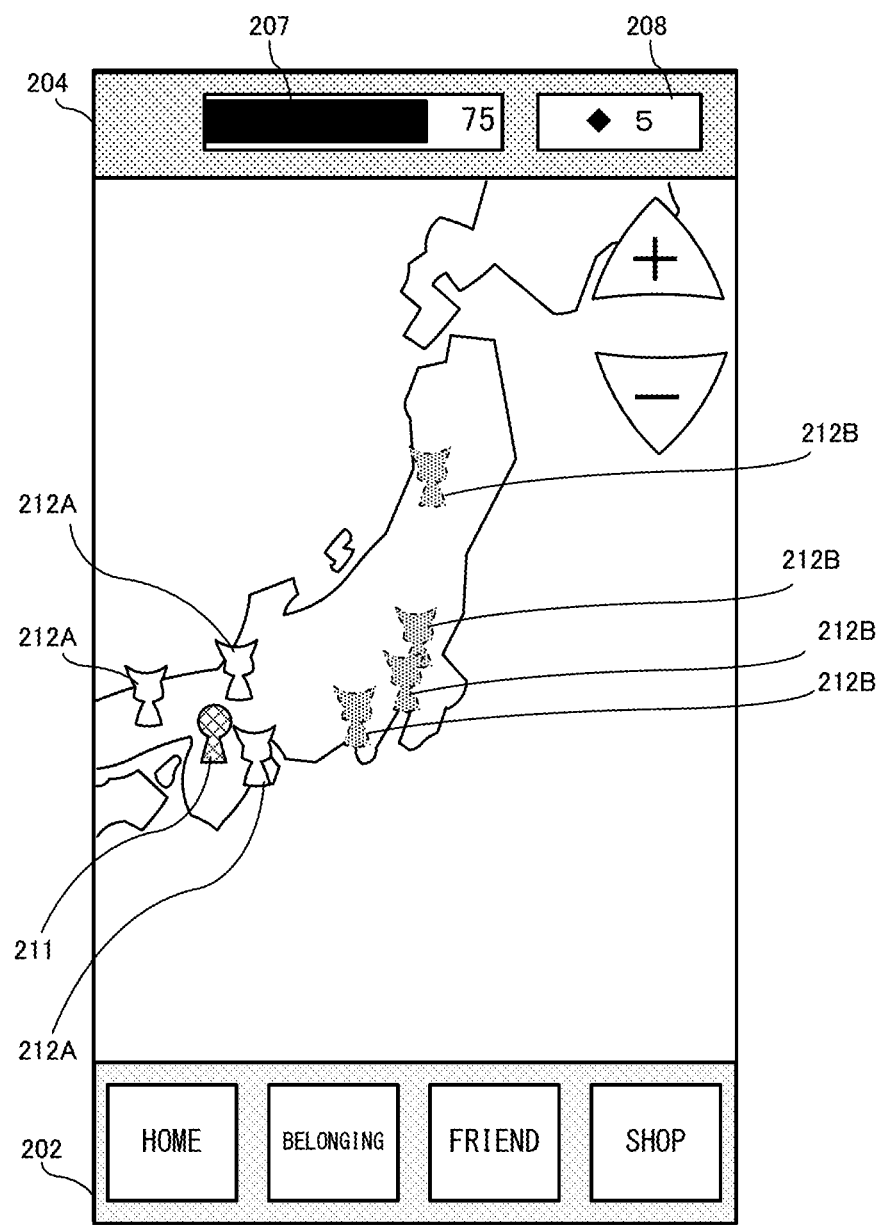
FIG. 5 shows a non-limiting example of a game screen according to the embodiment.

When the player taps, for example, the button image 203B on the home screen, the screen is switched to a screen as shown in FIG. 5 (hereinafter referred to as "map screen"). This map screen is a screen for performing an instruction to make the player object go to see an animal object. In FIG. 5, a header region 204 and a footer region 202 similar to those described above are displayed in the upper portion and the lower portion of the screen, respectively. A field object simulating the Japanese islands is displayed in a region, between the header and footer regions 204 and 202, which occupies a major part of the screen. On the field object, a player symbol 211 (corresponding to the player object 201) and a plurality of animal symbols 212A and 212B (respectively corresponding to the animal objects) are displayed (hereinafter, the animal symbols 212A and 212B may be collectively referred to as "animal symbol 212"). This map screen can be enlarged/reduced by, for example, pinch-out/pinch-in operation, or operation of an enlargement/reduction button displayed in an upper right portion of the screen. The map screen can also be enlarged by double-tapping an arbitrary point on the map. Further, slide operation enables scroll of the screen (movement of a virtual camera that is capturing the field object and the like).

The position of the player symbol 211 immediately after switching to the map screen corresponds to the current position of the player (smart device 102) in the real world. Likewise, the position of the animal symbol corresponds to a predetermined position in the real world, that is, the target position described above. That is, the distance relationship between the current position and the target position in the real world is reflected in the distance relationship between the player symbol 211 and each animal symbol 212. In this game, by selecting any of the animal symbols 212, the player can make the player object 201 go to see the animal object corresponding to the animal symbol 212.

Figure 6:
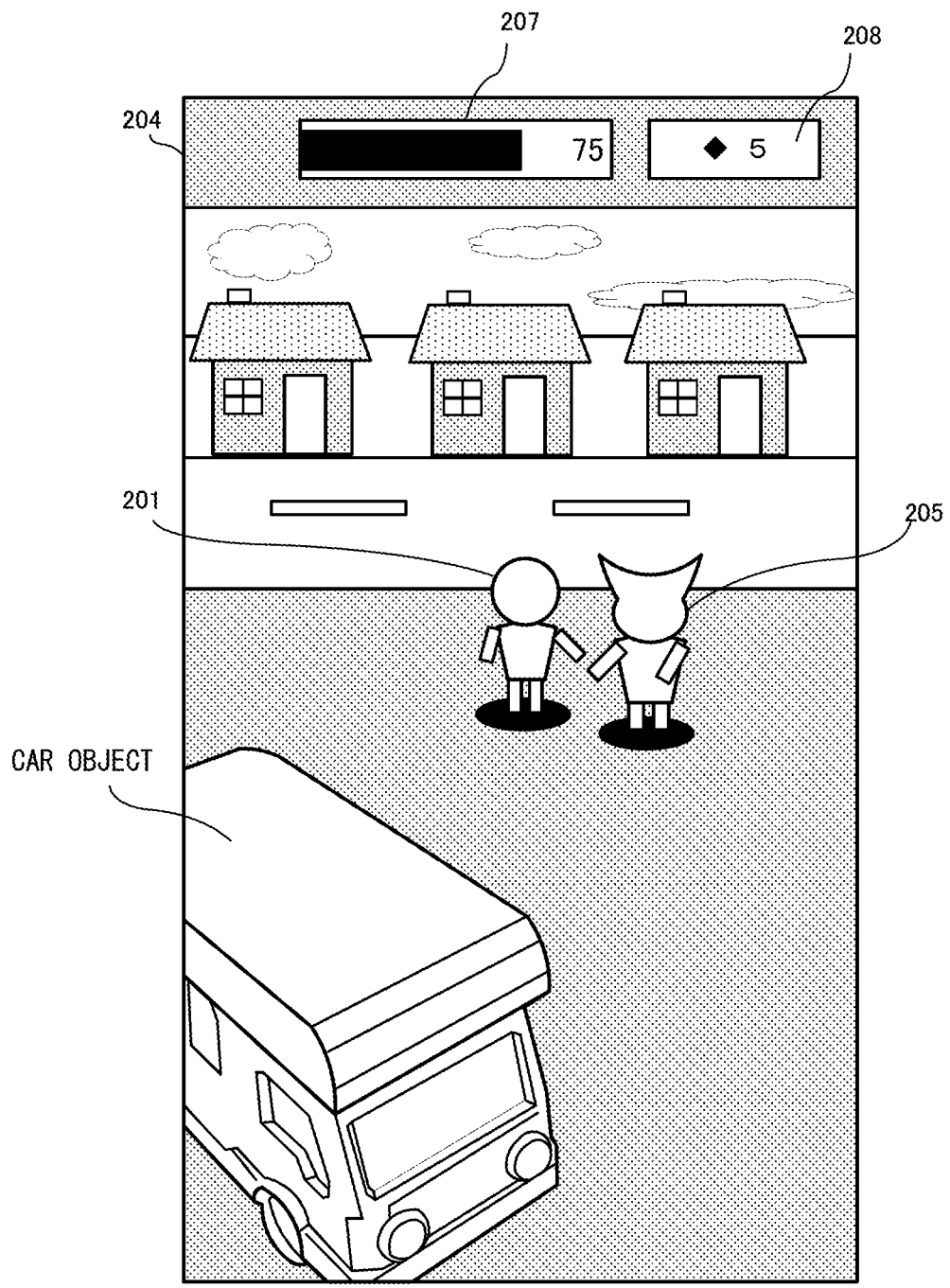
FIG. 6 shows a non-limiting example of a game screen according to the embodiment.

In this game, when the player object 201 goes to see the animal object in the game world, the player object 201 moves by a virtual "car (object)". A virtual parameter called "fuel" is set in this "car". Depending on the value of the fuel (hereinafter referred to as "fuel value"), the distance in which the "car" can move is determined. In other words, the fuel value can be regarded as a parameter value indicating the virtual movement range, movement distance, movement performance, or movement ability of the player object 201 (more precisely, this parameter can be regarded as a parameter indicating the player's activity, activity range, activity performance, movable range, movable distance, stamina, or the like). Therefore, the player object 201 cannot go to see the animal symbol 212 far distant from the position of the player symbol 211 because of shortage of the fuel value. In FIG. 5, two types of animal symbols, i.e., the animal symbols 212A and 212B, are shown. That is, the animal objects that the player object 201 can go to see and the animal objects that the player object 201 cannot go to see because of shortage of the fuel value, are distinguishingly displayed by making the display modes thereof different from each other. Specifically, each animal symbol 212B is obtained by gray-out display of an animal symbol 212A, and represents an animal object that the player object 201 cannot go to see because of shortage of the fuel value. Therefore, on the screen of FIG. 5, by selecting any of the animal symbols 212A, the player can make the player object 201 go to see the animal object corresponding to the selected animal symbol 212A. More specifically, when the player taps any of the animal symbols 212A, a message inquiring whether or not to go see the corresponding animal object is displayed (at this time, the required fuel value is also displayed). In response to the inquiry, when the player inputs an instruction to make the player object 201 go to see the corresponding animal object, a scene in which a car moves toward the selected animal symbol is displayed on the map screen, and thereafter, the screen is switched to a screen as shown in FIG. 6. FIG. 6 shows a scene in which the player object 201 receives an item from an animal object 205. Thereafter, returning to the map screen, a scene in which the player object 201 returns to the current position of the player by the car is displayed. Along with such representation, a fuel value according to the distance between the player symbol 211 and the animal symbol, that is, the distance between the current position and the target position (movement distance), is subtracted (consumed). In other words, in this game, in order to perform a process (e.g., receiving an item from an animal) based on the distance relationship in the real world, the parameter value called the fuel value needs to satisfy a predetermined condition (having fuel according to the distance between the current position and the target position).

The fuel value will be described in more detail. In FIG. 4 to FIG. 6, the header region 204 is displayed in the upper portion of the screen. In the header region 204, a fuel meter 207 and the number-of-jewels 208 are displayed. The fuel meter 207 is a horizontally-long bar-shaped meter for indicating the current fuel value. At the right end of the fuel meter 207, the current fuel value is numerically indicated. In the example of FIG. 6, the current fuel value is 75. In this game, the fuel value recovers according to the lapse of time. For example, the fuel value recovers by 1 every three minutes. An upper-limit value is set for the fuel value. For example, assuming that the upper-limit value is 100, the fuel value does not exceed 100 even with the lapse of time. The upper-limit value can be raised when a predetermined condition is satisfied. For example, if a "level" or a "rank" of the player is set, the upper-limit value of the fuel value can be raised by so-called "level up" or "rank up". The greater the upper-limit value is, the more the movable distance increases.

Further, in this game, the fuel value can be immediately increased (recovered) by using a predetermined item. Specifically, in this game, the player can purchase an item called "jewel" by using currency (real money) in the real world. Hereinafter, an item that the player can purchase by using currency in the real world is called a "charging item". The number-of-jewels 208 indicates the number of jewels currently possessed by the player is displayed. By using the jewels, the player can immediately increase the fuel value by a value equivalent to the set upper-limit value. For example, it is assumed that the upper-limit value of the fuel value is 100, and the current fuel value is 30. In this case, the fuel value can be increased to 130 by using the jewels. That is, the fuel value can temporarily exceed the set upper-limit value (at this time, the fuel meter 207 may display, for example, "100+" indicating that the player has the fuel value exceeding the upper-limit value). Alternatively, for example, increase in the fuel value may be limited to the upper-limit value. In this case, assuming that the upper-limit value of the fuel value is 100 and the current fuel value is 30, the fuel value can be increased by 70 by using the jewels. Further, for example, an upper limit may be set for the fuel value that can be increased by one jewel. For example, the fuel value that can be increased by one jewel may be 50. This upper-limit value may have some latitude, and the fuel value may be increased by a random value within this range. For example, the fuel value that can be increased by one jewel may be a random value within the range of 45 to 55 (i.e., the range of ±5 with respect to 50).

Further, in this game, the position of each animal object is not fixed but variable. That is, each animal object is allowed to move in the field object shown in FIG. 5. Therefore, for example, even when the current position of the player is not changed (the player himself/herself does not move), an animal object that the player object could go to see it an hour ago has moved to some distant place an hour later, so that the player object cannot go to see it (and vice versa). More specifically, the server 101 performs a process to change the position of each animal object, i.e., the target position, at predetermined time intervals (e.g., at intervals of 30 minutes), thereby to represent a state in which the animal object is moving. In order to represent the state in which each animal object is moving around, it is preferable not to change the target position largely at one time. For example, the range in which the target position is changed at one time may be limited to some extent.

Regarding movement of the animal objects, in another embodiment, the movement may be controlled within a predetermined range of the field object. For example, the animal objects may be moved within the region of each prefecture, or within the region of each country. Alternatively, in the field object, the animal objects may be moved within a region of a "land". A destination may be set for each animal object and the animal object may be moved to the destination, or no particular destination may be set and the animal object may be moved at random. When performing control to set the destinations of the respective animal objects, the control may be performed so as to prevent the animal objects from being unevenly located. For example, when performing control to move an animal A from a point X to a point Y, another animal B existing outside the point X may be moved to the point X.

Regarding the animal objects, in addition to the movement (positional change) thereof described above, a new animal object may be caused to appear.

In the present embodiment, the positions of the animal objects (on the map screen) are common to users (that is, the positional information of the animal objects is collectively managed by the server 101). However, in another embodiment, movement control or the like may be performed so that the positions of the animal objects vary from player to player.

As described above, in the present embodiment, in executing a process based on the distance between two points in the real world, the process is executed when a parameter such as the fuel value described above satisfies a predetermined condition relating to the distance. In other words, in executing a predetermined process (item acquisition process, etc.) according to the target position, when the parameter (fuel value) satisfies a predetermined condition according to the distance from the current position to the target position, the predetermined process is executed. In addition, the process according to the target position is executed even when the player does not actually move to the target position (the player can progress the game more advantageously by actually moving to the target position, whereby amusement of the game can be further enhanced). Thus, it is possible to provide a new game using positional information in the real world, particularly, the distance between two points.

The player can also increase the fuel value immediately by utilizing the charging items such as jewels described above. For example, when the player wants to make the player object go to see an animal object, the player may actually move to make the player object go to see the animal object with less fuel value, but such movement takes time and labor. In this case, by utilizing the charging items such as jewels, actual movement of the player can be dispensed with, whereby convenience of the player can be enhanced.

Regarding the position of each animal object (target position), the position is not fixed but is changed with the lapse of time. Thus, even when the player himself/herself does not actually move (even when the movement range of the player is small), it is possible to increase the opportunities for the player to make the player object go to see various animal objects, whereby amusement of the game can be enhanced.

Next, the operation of the game processing according to the present embodiment will be described in more detail with reference to FIGS. 7 to 17. In the following description, various processes not directly related to the process of making the player object 201 go to see the animal object 205 will not be described in detail.

FIG. 7 shows non-limiting examples of a program and data stored in the main memory 123 of the server 101. The main memory 123 stores therein a server-side game program 301, a player data base 302, animal object data 304, etc.

The server-side game program 301 is a program for causing the server 101 to operate as a game server in the game processing according to the present embodiment. Specifically, the server-side game program 301 is a program for executing process steps of flowcharts shown in FIGS. 16 and 17.

The player data base 302 is a data base that includes information relating to players of this game. In this game, each player performs player registration to the server 101 before the game is started. After the player registration, when the game processing is started in the smart device 102, a log-in process using a player ID and the like described later is performed, thereby enabling the player to play the game as described above.

FIG. 8 shows a non-limiting example of the structure of the player data base 302. In FIG. 8, the player data base 302 includes entries such as player ID 311, fuel value data 312, belonging data 313, etc. The player ID 311 is an ID for uniquely identifying each player. The fuel value data 312 is data indicating the current value and the upper-limit value of the above-described fuel value (in FIG. 8, the fuel value data 312 is represented in the form of "current value/upper-limit value"). The belonging data 313 is data indicating items possessed by the player.

The player data base 302 also includes, in addition to the entries described above, data of password used by each player for the log-in process, and data indicating a nickname, the current level, the number of possessed jewels, etc. of the player.

Referring back to FIG. 7, the animal object data 304 is data for managing the animal objects 205 (including the animal symbols 212) as described above. FIG. 9 shows the structure of the animal object data 304. The animal object data 304 is table data composed of object ID 321, existence position 322, possession item 323, etc. The object ID 321 is an ID for uniquely identifying each animal object. The existence position 322 is data indicating the position corresponding to the animal object (in the real world), and is also data indicating the target position described above. The existence position 322 is appropriately set by the server 101, and the content thereof is appropriately changed according to the lapse of time as described above. The possession item 323 indicates items possessed by the corresponding animal object, and is data of items to be collected by the player in this game.

Figures 10, 11:
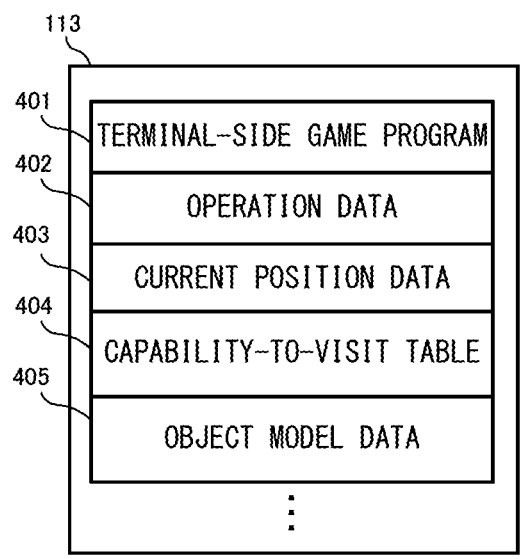
FIG. 10 shows a non-limiting example of a program and information stored in a main memory 113 of the smart device 102.
FIG. 11 shows a non-limiting example of the structure of a capability-to-visit table 404.

Next, a program and data stored in the smart device 102 will be described. FIG. 10 shows non-limiting examples of a program and data stored in the main memory 113 of the smart device 102. The main memory 113 stores therein a terminal-side game program 401, operation data 402, current position data 403, a capability-to-visit table 404, object model data 405, etc.

The terminal-side game program 401 is a program for executing the game processing according to the present embodiment in the smart device 102. Specifically, the terminal-side game program 401 is a program for executing process steps in flowcharts shown in FIGS. 12 to 15.

The operation data 402 is data indicating the contents of various operations performed to the operation section 115. In the present embodiment, the operation data 402 includes: data indicating whether there is an input to the touch panel as the operation section 115; data indicating touch coordinates; data indicating whether the various buttons (not shown) are in pressed states; and the like.

The current position data 403 is data indicating the current position of the smart device 102, which is acquired by the positional information acquiring section 117. In the present embodiment, during execution of the game processing, the current position data 403 is automatically acquired (updated) from the positional information acquiring section 117 at predetermined time intervals.

The capability-to-visit table 404 is data indicating whether or not the player object can go to see each of the animal objects described above. In other words, the capability-to-visit table 404 is data indicating whether or not the distance from the current position to the position of each animal object (target position) is equal to or less than the movable distance based on the current fuel value. FIG. 11 shows a non-limiting example of the structure of the capability-to-visit table 404. In FIG. 11, the capability-to-visit table 404 is composed of object ID 411, existence position 412, and capability-to-visit flag 413. The object ID 411 is an ID for identifying each animal object (basically, the object ID 411 has the same content as the object ID 321 in the animal object data described above). The existence position 412 is positional information indicating the current position of the corresponding animal object (i.e., the target position). The capability-to-visit flag 413 is a flag indicating whether or not the distance from the current position to the position of the animal object (i.e., the target position) is equal to or less than the movable distance according to the current fuel value. The capability-to-visit flag 413 being ON indicates that the distance is equal to or less than the movable distance (i.e., the player object can go to see the animal object). The object ID 411 and the existence position 412 are updated on the basis of the content of the animal object data that is acquired from the server 101 at predetermined time intervals. Whether the capability-to-visit flag 413 is to be ON or OFF is determined on the basis of the updated object ID 411 and existence position 412.

Referring back to FIG. 10, the object model data 405 is model data of various objects displayed in this game, such as the player object 201, the animal object 205, and the like.

Next, the flow of the game processing according to the present embodiment will be described with reference to the flowchart of FIGS. 12 to 17. For convenience in the description, not the case of resuming the game play from interruption thereof but the case of starting the game processing from the beginning will be described.

Figure 12:
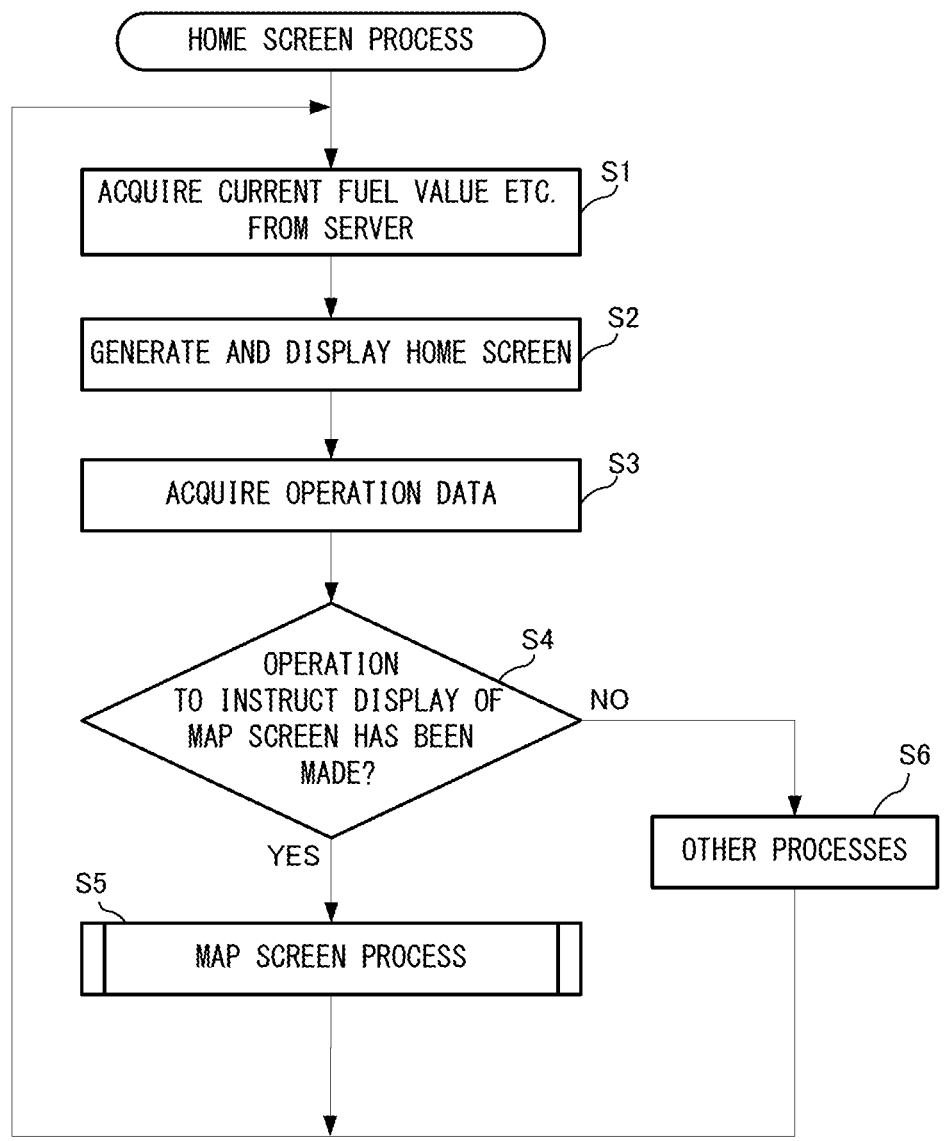
FIG. 12 is a flowchart showing a home screen process according to the embodiment in detail.

FIG. 12 is a flowchart showing a home screen process executed by the smart device 102. In the smart device 102, when a command for starting the game of the present embodiment is received, the home screen process is executed after a predetermined log-in process (not shown). In FIG. 12, first, in step S1, the processor section 111 of the smart device 102 acquires, from the server 101, various data indicating the current state of the player, such as the current fuel value, the current level of the player, etc.

Next, in step S2, the processor section 111 of the smart device 102 performs, for example, a process of reflecting the acquired current fuel value in the display of the fuel meter 207, thereby generating and displaying the home screen as described above.

Next, in step S3, the processor section 111 of the smart device 102 acquires the operation data 402. Next, in step S4, the processor section 111 of the smart device 102 determines, on the basis of the operation data 402, whether or not an operation to instruct display of the map screen has been made. When the result of the determination is that the operation has been made, the processor section 111 advances to a map screen process in step S5. Otherwise, the processor section 111 of the smart device 102 executes, as appropriate, another game processing based on the content of operation in step S6. For example, if the player is executing the process of purchasing a jewel described above, the processor section 111 executes, in cooperation with the server 101, the process relating to purchase of a jewel. When an instruction to immediately increase the fuel value by using a jewel has been made, the processor section 111 executes, in cooperation with the server 101 (by exchanging predetermined data), a process of updating the content of the fuel value data 312. Thereafter, the processor section 111 returns to the process in step S1 and repeats the above-described process steps.

Figure 13:
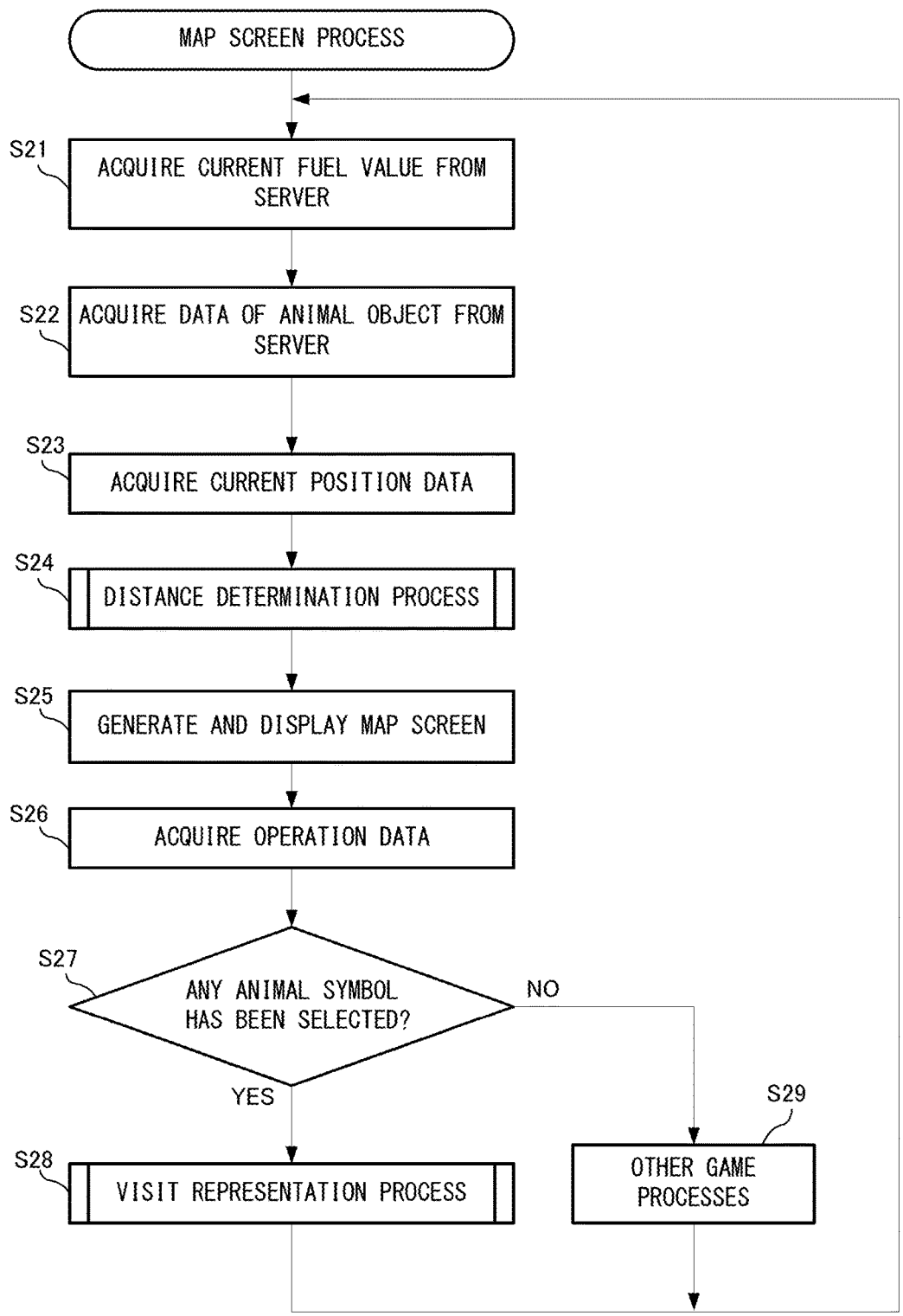
FIG. 13 is a flowchart showing a map screen process of step S5 in FIG. 12 in detail.

FIG. 13 is a flowchart showing the map screen process in step S5 in detail. In FIG. 13, first in step S21, the processor section 111 of the smart device 102 acquires the fuel value data 312 from the player data base 302 of the server 101. In the subsequent step S22, the processor section 111 acquires the animal object data 304 from the server 101, and updates the content of the capability-to-visit table 404 on the basis of the animal object data 304. That is, the processor section 111 executes the process of updating the object ID 411 and the existence position 412 on the basis of the content of the acquired animal object data 304, and determining and setting the content of the capability-to-visit flag 413 on the basis of the updated contents of the object ID 411 and the existence position 412. Specifically, regarding an animal object that has not yet been registered in the capability-to-visit table 404, the process of adding the object ID 411 and the existence position 412 thereof to the capability-to-visit table 404 is performed. Regarding an already registered animal object, the process of updating the existence position 412 thereof is performed as appropriate. Regarding the content of the animal object data 304 acquired from the server 101, in order to reduce the data communication amount, the animal object data 304 to be acquired may be limited to the data within a predetermined range of the map described above (e.g., within a range in units of countries or prefectures, or a predetermined range from the position of the player object 201). Setting of the capability-to-visit flag 413 will be described later.

Next, in step S23, the processor section 111 acquires the current position data 223. Next, in step S24, the processor section 111 executes a distance determination process. The distance determination process is a process of determining, for each animal object, whether or not the player object having the current fuel value can go to see the animal object.

Figure 14:
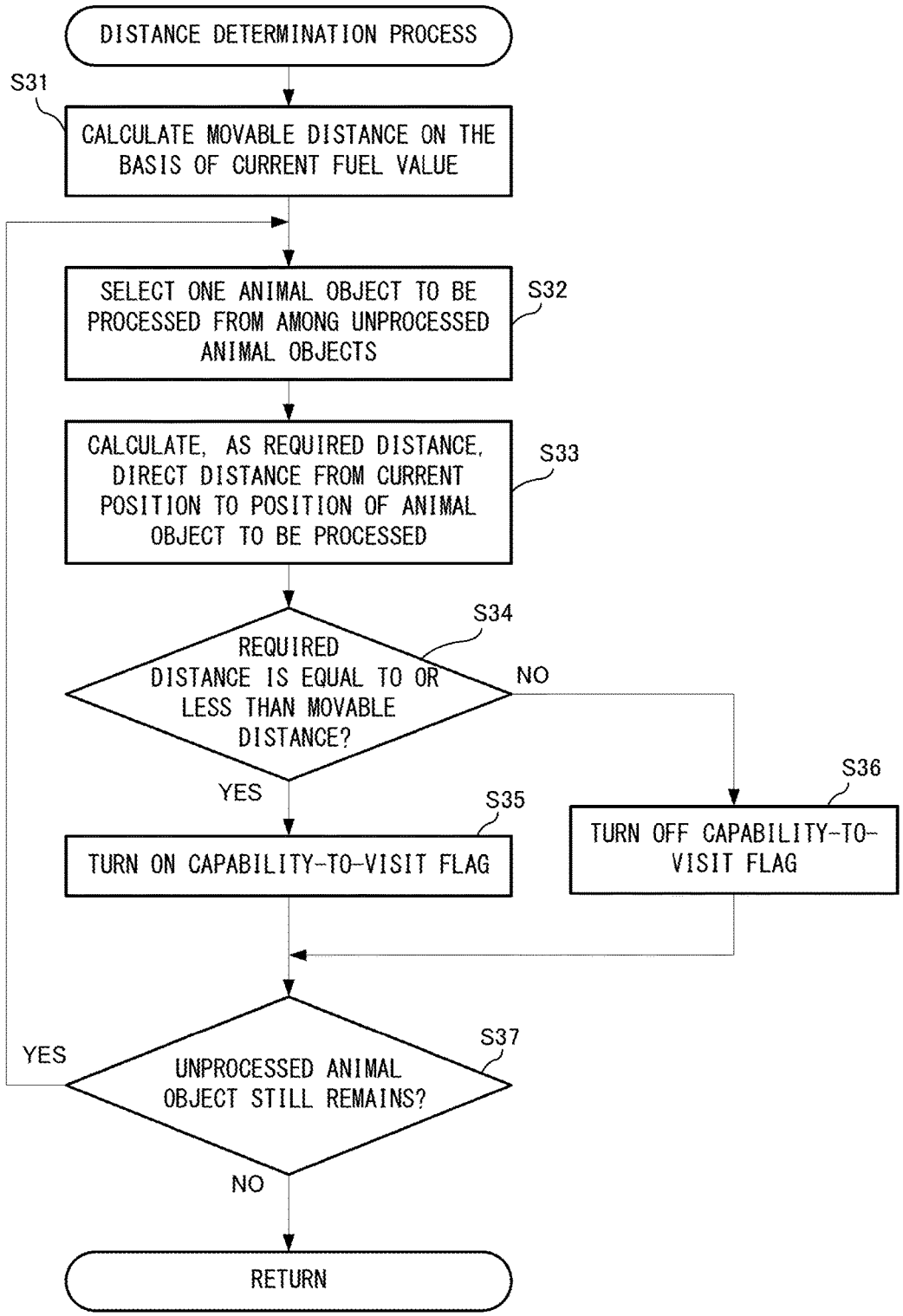
FIG. 14 shows an operation at content switching at step S24 in FIG. 13.

FIG. 14 is a flowchart showing the distance determination process in detail. First, in step S31, the processor section 111 calculates the movable distance from the current position on the basis of the current fuel value acquired from the server 101 in step S21. Next, in step S32, with reference to the capability-to-visit table 404, the processor section 111 selects one animal object to be subjected to the following process (that is, one animal object that has not yet been subjected to the following process). Hereinafter, this object is referred to as an object to be processed.

Next, in step S33, on the basis of the current position of the smart device 102 and the existence position 412 of the object to be processed, the processor section 111 calculates, as a required distance, the direct distance between them. Next, in step S34, the processor section 111 determines whether or not the calculated required distance is equal to or less than the above-described movable distance. When the result of the determination is that the required distance is equal to or less than the movable distance (YES in step S34), the processor section 111, in step S35, turns on the capability-to-visit flag 413 relating to the object to be processed. On the other hand, when the required distance is not equal to or less than the movable distance (NO in step S34), the processor section 111, in step S36, turns off the capability-to-visit flag 413 relating to the object to be processed.

Next, in step S37, the processor section 111, with reference to the capability-to-visit table 404, determines whether or not any animal object that has not yet been subjected to the processes in steps S32 to S36 still remains. When the result of the determination is that such an animal object still remains (YES in step S37), the processor section 111 returns to step S32, selects a next object to be processed, and subjects the selected object to the process steps as described above. On the other hand, when such an animal object does not remain (NO in step S37), the distance determination process is ended.

Regarding the processes in steps S31 to S34, in another embodiment, the required distance may be converted into the fuel value to calculate a "required fuel value", and whether or not the current fuel value is more than the "required fuel value" may be determined.

Referring back to FIG. 13, next in step S25, the processor section 111 generates and displays a map screen in which the results of the processes described above are reflected. Specifically, the processor section 111 locates the player symbol 211 at a position corresponding to the current position of the smart device on the field object. In addition, the processor section 111, on the basis of the capability-to-visit table 404, appropriately locates the animal symbols corresponding to the respective animal objects on the field object. At this time, as for the animal symbols whose capability-to-visit flags 413 are OFF, these animal symbols are set to be displayed in a gray-out manner. Then, the processor section 111 generates a map screen based on these contents, and displays the map screen on the screen. As the result, for example, an image as shown in FIG. 5 is displayed on the screen.

Next, in step S26, the processor section 111 acquires the operation data 402. Next, in step S27, the processor section 111, on the basis of the operation data 402, determines whether or not an operation (e.g., tapping operation) to select any one of the animal symbols 212 on the map screen has been performed. When the result of the determination is that any of the animal symbols 212 has been selected (YES in step S27), a visit representation process is executed in step S28. On the other hand, when none of the animal symbols 212 has been selected (NO in step S27), another game processing is executed as appropriate in step S29. For example, when an instruction to return to the home screen has been made, the map screen process is ended to start the home screen process.

Figure 15:
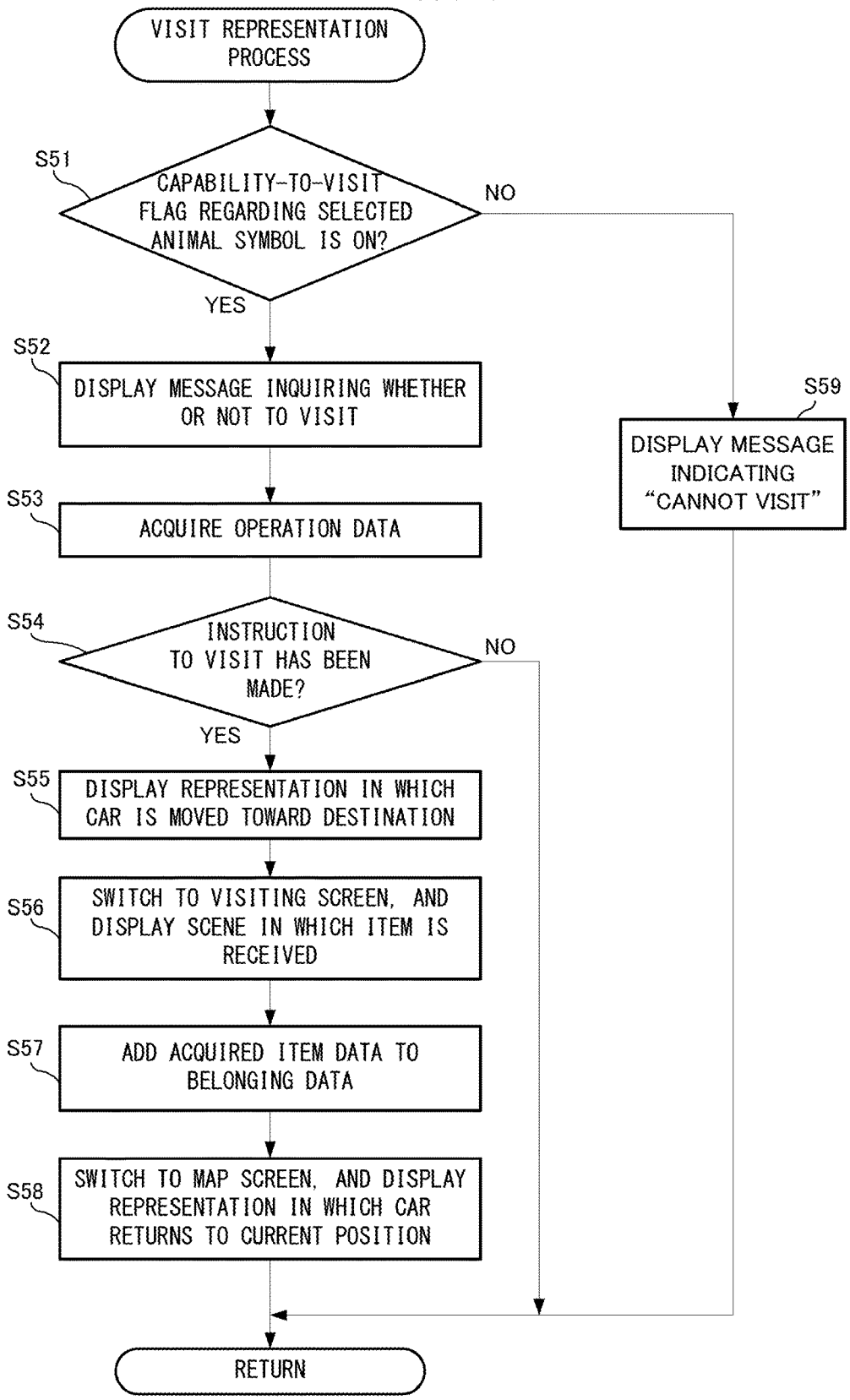
FIG. 15 is a flowchart showing a visit representation process of step S28 in FIG. 13 in detail.

FIG. 15 is a flowchart showing the visit representation process in detail. First, in step S51, the processor section 111 determines whether or not the distance from the current position to the position corresponding to the selected animal symbol 212 (i.e., the target position) is equal to or less than the movable distance. Specifically, the processor section 111 determines whether or not the capability-to-visit flag 413 of the animal object corresponding to the selected animal symbol 212 is ON. When the result of the determination is that the capability-to-visit flag 413 is OFF (NO in step S51), the processor section 111, in step S59, displays a message indicating, for example, that the player object cannot go to see the animal object corresponding to the selected animal symbol 212, and the fuel value required if the player object goes to see the animal object, and ends the visit representation process.

On the other hand, when the capability-to-visit flag 413 is ON (YES in step S51), the processor section 111, in step S52, displays a message inquiring whether or not the player object will go to see the animal object corresponding to the selected animal symbol 212.

Next, in step S53, the processor section 111 acquires the operation data 402. In the subsequent step S54, the processor section 111, on the basis of the operation data 402, determines whether or not an instruction indicating that the player object will go to see the animal object has been inputted in response to the above inquiry. When the result of the determination is that such an instruction has been inputted (YES in step S54), the processor section 111, in step S55, displays a representation in which a car object is caused to travel toward the selected animal symbol 212. Subsequently, in step S56, the processor section 111 generates and displays a "visiting screen" as shown in FIG. 6, and displays a representation in which the player object 201 receives an item from the animal object 205. Further, in step S57, the processor section 111 transmits, to the server 101, an instruction requesting addition of data of this item to the belonging data 313. In response to this request, the server 101 executes a process of adding the data of the item to the belonging data 313. Regarding addition of such item data, for example, the number of times the player object can get items may be limited such that the player object can get an item once a day from one animal object. Regarding an animal symbol from which the player object has already got an item and therefore cannot get an item anymore, the display manner of this animal symbol may be changed when being displayed on the map screen so that the player can recognize the animal symbol.

Next, in step S58, the processor section 111 displays the map screen again, and displays a representation in which the player object returns to the current position by the car. Then, the processor section 111 ends the visit representation process.

On the other hand, as the result of the determination in step S54, when an instruction indicating that the player object will not go to see the animal object has been inputted (NO in step S54), the processes in steps S55 to S58 described above are not performed and the visit representation process is ended.

This is the end of the description of the smart device side game processing.

Next, processes relating to the present embodiment among processes to be performed in the server 101 will be described. Specifically, in the server 101, a process of causing each animal object to move, that is, a process of changing the target position in accordance with the lapse of time, is performed. In addition, a process of increasing (recovering) the fuel value of each player in accordance with the lapse of time or the like is also performed.

Figure 16:
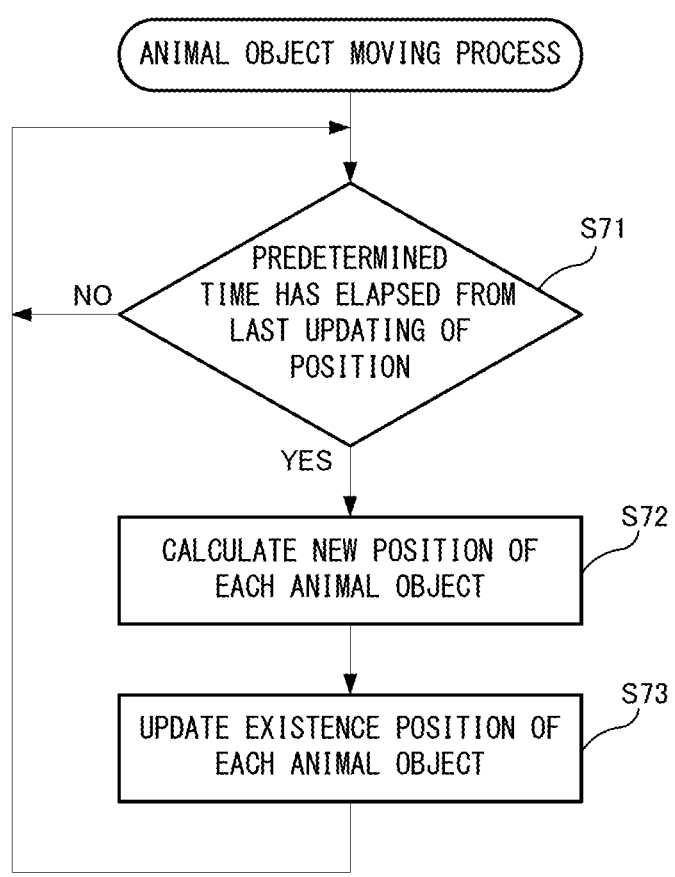
FIG. 16 is a flowchart showing an animal object moving process according to the embodiment in detail.

FIG. 16 is a flowchart showing the process of causing each animal object to move in detail. First, in step S71, the processor section 121 of the server 101 determines whether or not a predetermined specific time has elapsed from the last updating of the target position. When the result of the determination is that the predetermined time has not yet elapsed (NO in step S71), this determination is repeated until the predetermined time elapses. On the other hand, if the predetermined time has elapsed (YES in step S71), the processor section 121 of the server 101, in step S72, calculates a new position of each animal object. Any calculation method may be adopted. In the present embodiment, the new position is calculated so as not to be very distant from the current position. For example, assuming that the predetermined time is 30 minutes, the new position is calculated within a radius of 1 km from the current existence position. Regarding the size of this range (radius), different values may be used for different animal objects. For example, an animal object modeled after a fast-moving animal may have the range wider than the ranges of the other animal objects.

In another embodiment, as a process of causing each animal object to move, a process of setting a specific destination and causing the animal object toward the destination may be executed.

Next, in step S73, the processor section 121 of the server 101 updates the existence position 322 of each animal object on the basis of the new position calculated as described above. Then, the processor section 121 returns to step S71, and repeats the process steps. This is the end of the description of the process for causing each animal object to move.

Figure 17:
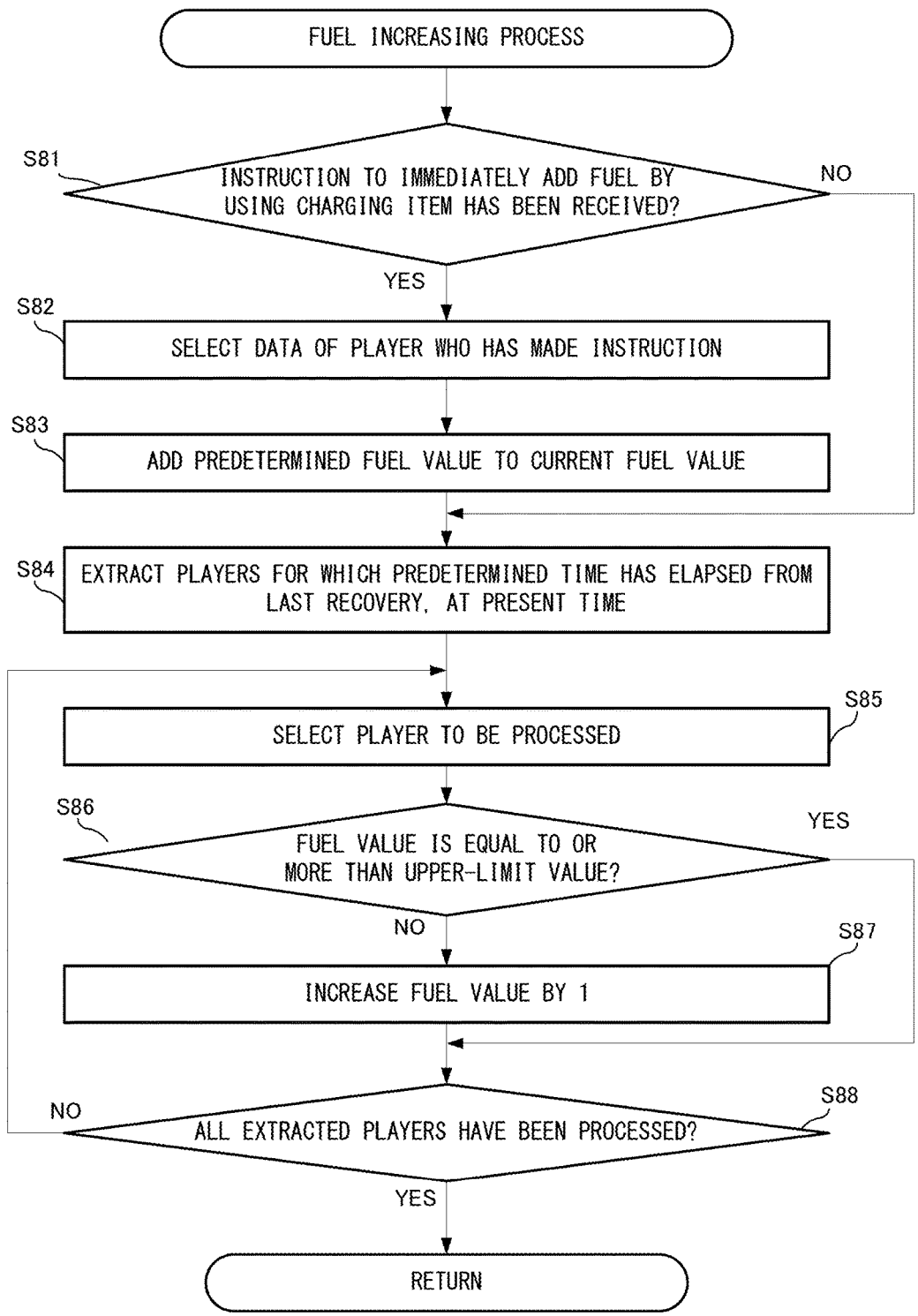
FIG. 17 is a flowchart showing a fuel increasing process according to the embodiment in detail.

FIG. 17 is a flowchart showing a process of increasing the fuel value of the player. First, in step S81, the processor section 121 of the server 101 determines whether or not an instruction to add a fuel value by utilizing the jewel (charging item) described above has been received from the smart device 102. When the result of the determination is that such an instruction has been received (YES in step S81), data relating to the player who has transmitted this instruction is selected from the player data base 302 in step S82. Next, in step S83, the processor section 121 of the server 101 adds a predetermined value according to the used item to the current fuel value of the player (this addition may cause the current fuel value to temporarily exceed the upper-limit value). Then, the processing is advanced to the next step S84.

On the other hand, when the result of the determination in step S81 is that an instruction to add a fuel value is not received (NO in step S81), the processes in steps S82 to S83 are skipped.

Next, the processor section 121 of the server 101 executes a process relating to recovery of the fuel value with the lapse of time. Specifically, in step S84, the processor section 121 of the server 101 executes a process of extracting, from the player data base 302, data of players for which a predetermined specific time has elapsed from the last recovery, at present time. Next, in step S85, the processor section 121 selects one piece of player data to be processed from among the extracted player data. Next, in step S86, the processor section 121 of the server 101 determines whether or not the current fuel value of the player to be processed is equal to or more than the upper-limit value. When the result of the determination is that the current fuel value is not equal to or more than the upper-limit value (NO in step S86), the processor section 121 of the server 101, in step S87, adds 1 to the current fuel value. When the current fuel value is equal to or more than the upper-limit value (YES in step S86), the process in step S87 is skipped.

Next, in step S88, the processor section 121 of the server 101 determines whether or not all the extracted player data have been subjected to the processes in steps S85 to S87. If some of the extracted player data remain unprocessed (NO in step S88), the processor section 121 returns to step S85 and repeats the process steps. When all the extracted player data have been processed (YES in step S88), the process of increasing the fuel value is ended.

This is the end of the description of the game processing according to the present embodiment.

As described above, in the game processing according to the present embodiment, when the distance between the current position of the player (smart device 102) and the target position is equal to or less than the movable distance calculated from the fuel value, the player can make the player object go to see the animal object (virtually) existing at the target position. In addition, by using the charging item such as a jewel described above, the fuel value, which is basically recovered with lapse of time, can be immediately increased. Therefore, even when the player cannot make the player object go to see the animal object because of shortage of the fuel value, the player can make the player object go to see the animal object by absolving actual movement of the player himself/herself, or by temporarily increasing the fuel value to a value exceeding the upper-limit value, whereby convenience of the player can be enhanced. In addition, the position of each animal object (target position) is changed according to the lapse of time. Thus, it is possible to increase the opportunities for the player to make the player object go to see various animal objects, thereby enhancing amusement of the game.

(Modifications)

Regarding determination as to whether or not the player object can go to see the animal object, this determination may be performed by the following process. In the above example, the determination is performed on the basis of the distance between the two points. However, in the example described below, the determination is performed using a "range". The determination using a "range" as described below is "lenient", compared with the determination based on the distance between the two points (between the positional coordinates), whereby the degree of difficulty of the game is adjusted to further enhance amusement of the game (that is, difficulty of the game is adjusted by providing some "latitude" or "allowance" to the positional coordinates indicating a certain point).

Figure 18:
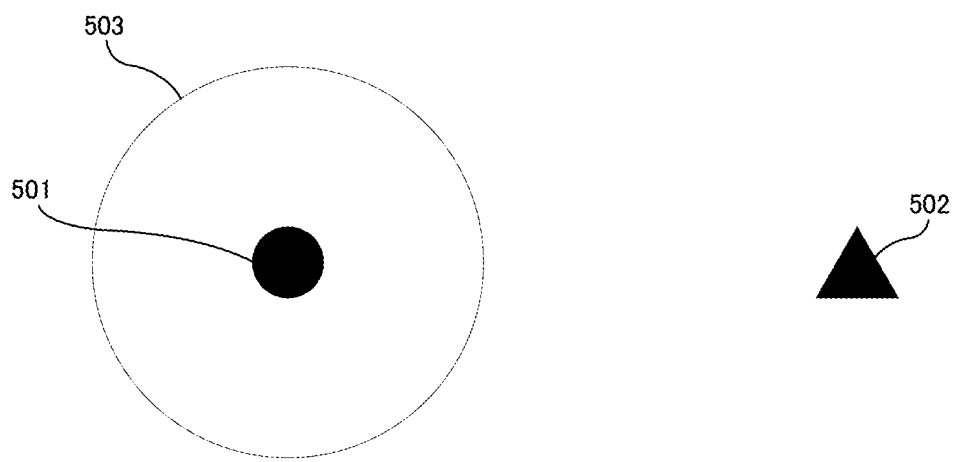
FIG. 18 shows another example of a process to determine whether or not a player object can go to see an animal object.

FIG. 18 shows the principle of another example of the process of determining whether or not the player object can go to see an animal object. In this example, first, a movable range 503 around a current position 501 is calculated on the basis of the fuel value at that time. Then, whether or not a target position 502 exists within the movable range 503 is determined. As for a target position within the range 503, it is determined that the player object "can go to see" an animal object at this target position.

Figure 19:
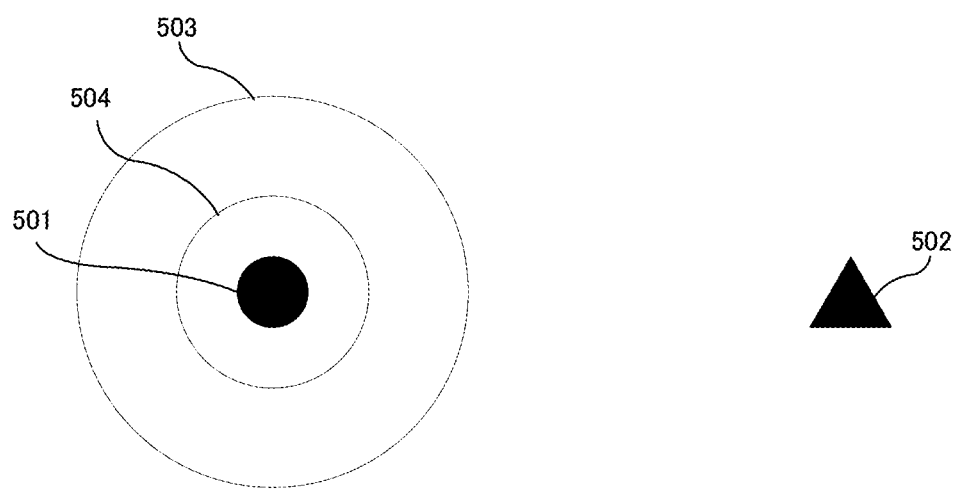
FIG. 19 shows another example of a process to determine whether or not a player object can go to see an animal object.

FIG. 19 shows another example. In this example, first, a predetermined range 504 around a current position 501 is calculated. This predetermined range is a predetermined fixed range. Hereinafter, this range is referred to as a fixed range 504. Next, a movable range 503 based on the fuel value is calculated. Then, whether or not a target position 502 exists in either of the ranges is determined. In this example, even when the fuel value is small, that is, even when, in FIG. 19, the circle of the movable range 503 is smaller than the circle of the fixed range 504 or there is almost no movable range 503, a target position existing within the fixed range 504 is determined so that the player object "can go to see" an animal object at the target position. It is preferable that this fixed range is not very large in terms of allowing the current position to have some "latitude".

Figure 20:
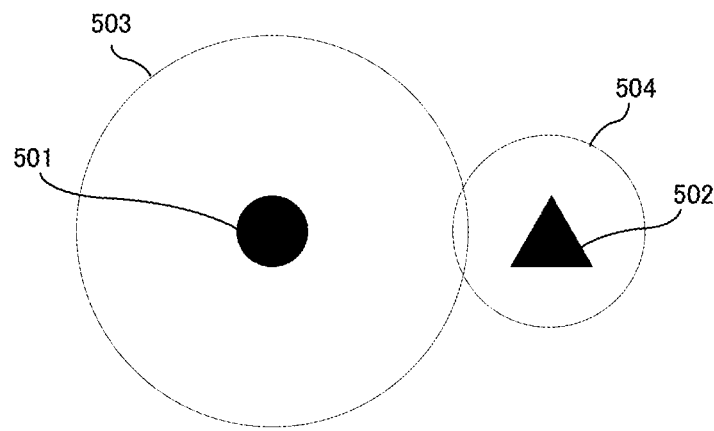
FIG. 20 shows another example of a process to determine whether or not a player object can go to see an animal object.

FIG. 20 shows still another example. In this example, a movable range 503 around a current position 501 is calculated on the basis of the fuel value. In addition, a fixed range 504 around a target position 502 is calculated. Then, whether or not there is an overlapped portion between the two ranges is determined. When there is such an overlapped portion, it is determined that the player object "can go to see" the animal object.

Figure 21:
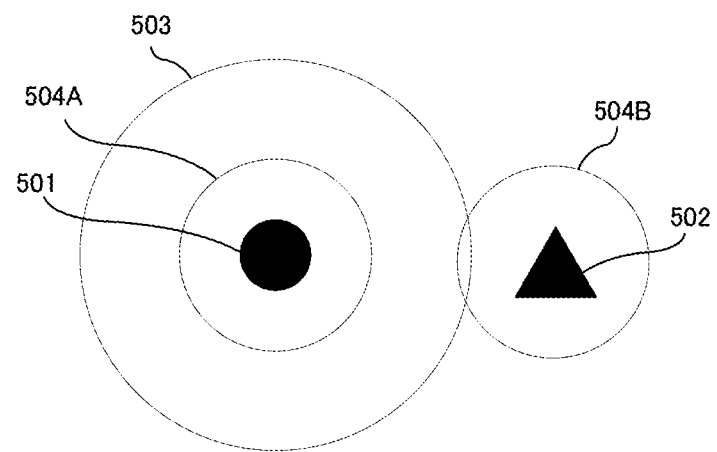
FIG. 21 shows another example of a process to determine whether or not a player object can go to see an animal object.
Figure 22:
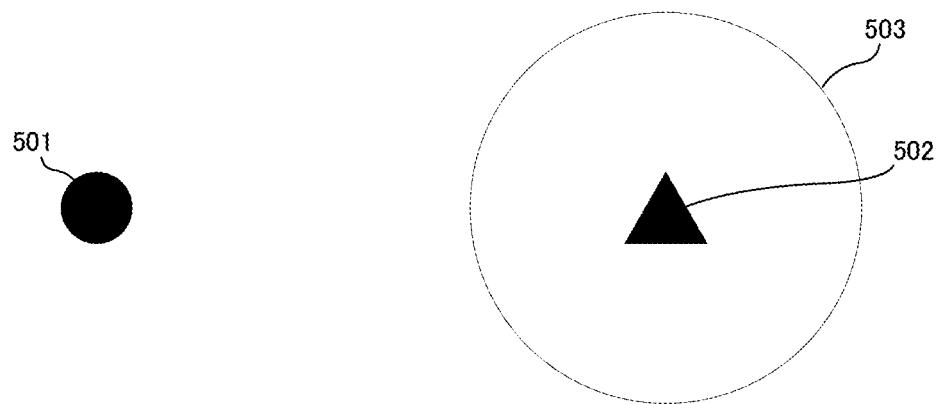
FIG. 22 shows another example of a process to determine whether or not a player object can go to see an animal object.
Figure 23:
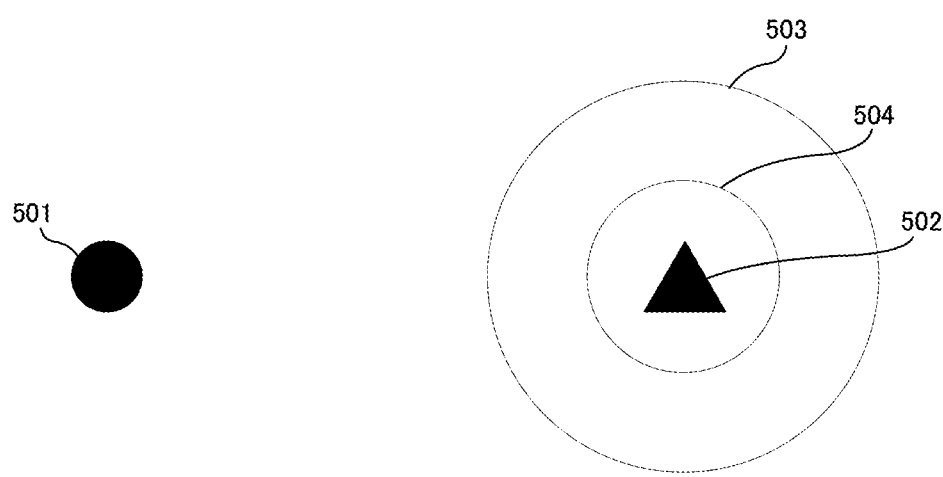
FIG. 23 shows another example of a process to determine whether or not a player object can go to see an animal object.

FIG. 21 shows still another example. In this example, a fixed range 504A around a current position 501 and a fixed range 504B around a target position 502 are calculated. Further, a movable range 503 around the current position 501 is calculated on the basis of the fuel value. Then, whether or not the fixed range 504B overlaps with any of the fixed range 504A and the movable range 503 is determined.

Figure 24:
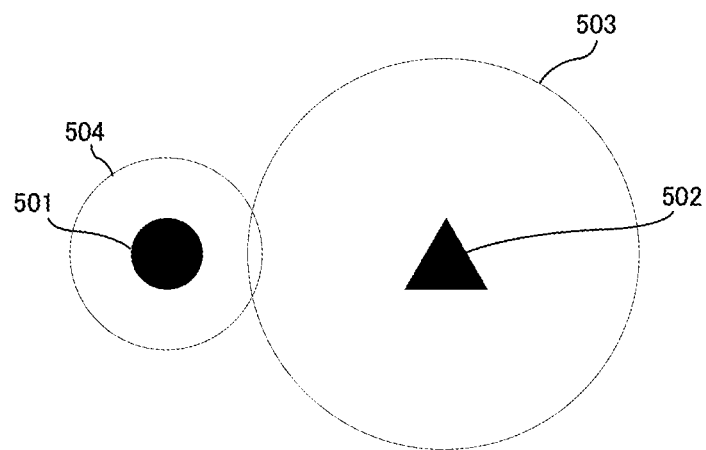
FIG. 24 shows another example of a process to determine whether or not a player object can go to see an animal object.
Figure 25:
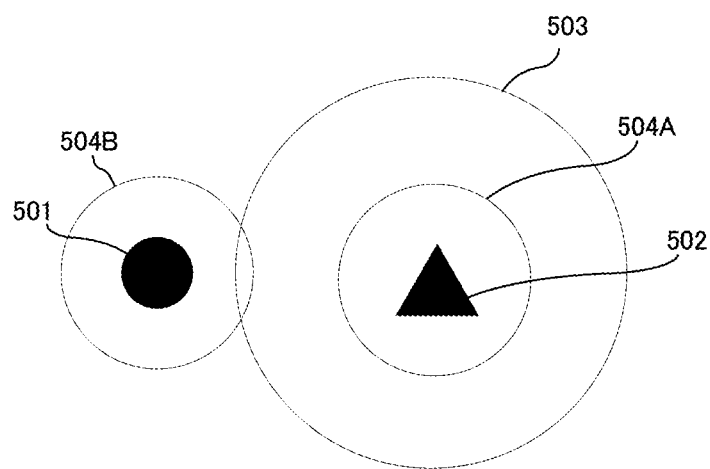
FIG. 25 shows another example of a process to determine whether or not a player object can go to see an animal object.

FIGS. 22 to 25 each show still another example. These examples are similar to the examples shown in FIGS. 18 to 21 except that the relationship between the current position 501 and the target position 502 is inverted. That is, in the example of FIG. 22, a movable range 503 is set on the target position 502 side. Also in the example of FIG. 23, a fixed range 504 and a movable range 503 are set on the target position 502 side. In any example, whether or not a current position 501 exists within any of the ranges is determined. In the example of FIG. 24, a movable range 503 is set on the target position 502 side while a fixed range 504 is set on the current position 501 side. In the example of FIG. 25, a fixed range 504A and a movable range 503 are set on the target position 502 side while a fixed range 504B is set on the current position 501 side. In any example, whether or not there is an overlapped portion between the ranges is determined.

Regarding the distance determination process described above, in the above example, this process is executed mainly on the smart device side. However, the distance determination process may be performed on the server 101 side, and data indicating the result of the determination may be transmitted to the smart device 102. Then, in the smart device 102, the map screen may be generated and displayed on the basis of the data indicating the result of the determination. The server 101 side may be a server system composed of a plurality of information processing apparatuses, and the process to be executed on the server side may be divided and executed by the plurality of information processing apparatuses.

In the embodiment described above, an example of a game in which a player object goes to see an animal object to get an item from the animal object, has been described. However, the game may be configured as follows. For example, a player can get a "material" by progressing a game play other than "going to see an animal". Then, the player makes a player object go to see an animal object to exchange the "material" for an "item". This item is preferably an item that can be obtained only by exchanging with the "material". This configuration further enhances amusement of the game.

In the above embodiment, the information indicating the target position is acquired from the game server 101. However, in another embodiment, setting, updating, and the like of the target position may be performed as processes on the smart device 102 side without using the game server 101.

What is claimed is:

1. A computer-readable non-transitory storage medium having stored therein a game program for a video game, the game program executed by a computer of an information processing apparatus, the game program comprising instructions that cause the computer to:
   acquire positional information;
   acquire, by using the acquired positional information, a current position of the information processing apparatus in the real world;
   calculate a distance between a target position in the real world, and the current position of the information processing apparatus in the real world;
   determine whether a virtual movement range for a player virtual object satisfies a first condition, wherein the first condition is based on the calculated distance, wherein the virtual movement range is a constraint on how far the player virtual object is allowed to move within a virtual world of the video game; and
   based on results of the determination, control game processing of the video game by using the calculated distance.

2. The computer-readable non-transitory storage medium of claim 1, the game program comprising instructions that cause the computer to:
   calculate a second distance according to the virtual movement range of the player virtual object,
   wherein the first condition is satisfied as a result of the calculated distance being equal to or less than the second distance.

3. The computer-readable non-transitory storage medium of claim 1, the game program comprising instructions that cause the computer to:
   determine whether the virtual movement range is larger than a value according to the calculated distance,
   wherein the first condition is satisfied as a result of the virtual movement range being larger than the value according to the calculated distance.

4. The computer-readable non-transitory storage medium of claim 1, the game program comprising instructions that cause the computer to: subtract a value from the virtual movement range of the player virtual object, wherein the value is based on the calculated distance.

5. The computer-readable non-transitory storage medium of claim 1, the game program comprising instructions that cause the computer to: increase the virtual movement range of the player virtual object by satisfying a second condition.

6. The computer-readable non-transitory storage medium of claim 1, wherein an upper-limit value is set for the virtual movement range of the player virtual object.

7. The computer-readable non-transitory storage medium of claim 1, the game program comprising instructions that cause the computer to: display a positional relationship between the current position and the target position on a display screen coupled to the information processing apparatus.

8. The computer-readable non-transitory storage medium of claim 7, the game program comprising instructions that cause the computer to: display a virtual map, wherein a first virtual object is displayed at a location on the virtual map that is based on the current position and a second virtual object is display at a location on the virtual map that is based on the target position.

9. The computer-readable non-transitory storage medium of claim 8, wherein the target position is one among a plurality of target positions and the second virtual object is one among a plurality of second virtual objects, which each one of the plurality of second virtual objects respectively associated with at least one of the plurality of target positions,
   wherein the game program comprises instructions that cause the computer to:
   process input specifies any of the plurality of second virtual objects.

10. The computer-readable non-transitory storage medium of claim 9, wherein the game program comprises instructions that cause the computer to:
    display different ones of the plurality of second virtual objects in different display modes based on whether a corresponding second virtual object satisfies a condition.

11. The computer-readable non-transitory storage medium of claim 1, wherein the target position is changed according to a predetermined condition.

12. The computer-readable non-transitory storage medium of claim 11, wherein the target position is changed according to a lapse of time.

13. The computer-readable non-transitory storage medium of claim 11, wherein the target position is moved according to a lapse of time so that a second virtual object moves on a virtual map according to the lapse of time.

14. The computer-readable non-transitory storage medium of claim 1, wherein the information processing apparatus is a smart device.

15. The computer-readable non-transitory storage medium of claim 1, wherein the positional information is acquired using a GPS receiver.

16. A game processing method for controlling an information processing apparatus, the method comprising:
    executing, on the information processing apparatus, a game program for a video game;
    acquiring position information;
    determining, by using the acquired positional information, a current position of the information processing apparatus in the real world;
    calculating a distance between a target position in the real space, and the current position of the information processing apparatus in the real world;
    determining whether a virtual movement range for a player virtual object satisfies a first condition, wherein the first condition is based on the calculated distance, wherein the virtual movement range is a constraint on how far the player virtual object is allowed to move within a virtual world of the video game; and
    based on a result of the determination, controlling game processing of the video game by using the calculated distance.

17. A game system comprising:
    a game server that includes a transceiver configured to transmit target position data of a location in the real world;
    an information processing apparatus that includes a transceiver for receiving the target position data transmitted from the gam server, the input processing apparatus including a processing system that includes at least one hardware processor, the processing system configured to:
    determine a current position of the information processing apparatus in the real world;
    calculate a distance between a target position in the real world, and the current position of the information processing apparatus in the real world;
    process video game input provided to the computer during execution of the game program; and
    based on the processed video game input, control a virtual object to move to different locations within the virtual world, wherein the calculated distance is used to control how the virtual object is allowed to be moved to the different locations within the virtual world of the video game.

18. The game system according to claim 17, wherein the information processing apparatus includes a GPS receiver for acquiring positional information that is used to determine the current position of the information processing apparatus.

19. An information processing apparatus communicable with a game server and configured at least to acquire positional information, the game server including a transmission interface configured to transmit information indicating a target position that is a position corresponding to a predetermined position in the real world, to the information processing apparatus, according to a request from the information processing apparatus, the information processing apparatus comprising:
    a processing system that includes one or more hardware processors, the processing system configured to:
        acquire, by using the acquired positional information, a current position of the information processing apparatus in the real world;
        calculate a distance between a target position in the real world, and the current position of the information processing apparatus in the real world;
        determine whether a virtual movement range for the a player virtual object satisfies a first condition, wherein the first condition is based on the calculated distance, wherein the virtual movement range is a constraint on how far the player virtual object is allowed to move within a virtual world of the video game; and
        based on results of the determination, control game processing of the video game by using the calculated distance.

20. The information processing apparatus according to claim 19, further comprising a GPS receiver for acquiring the positional information.

\* \* \* \* \*